(12) United States Patent
Patterson et al.

(10) Patent No.: US 10,957,894 B2
(45) Date of Patent: Mar. 23, 2021

(54) BATTERY BUS BAR MODULE

(71) Applicant: TE CONNECTIVITY CORPORATION, Berwyn, PA (US)

(72) Inventors: Jeremy Christin Patterson, Winston-Salem, NC (US); Weiping Zhao, Superior Township, MI (US); Xiaobao Geng, Troy, MI (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 65 days.

(21) Appl. No.: 16/371,208

(22) Filed: Apr. 1, 2019

(65) Prior Publication Data

US 2020/0313139 A1 Oct. 1, 2020

(51) Int. Cl.
| | |
|---|---|
| *H01M 2/20* | (2006.01) |
| *H01M 2/34* | (2006.01) |
| *H01M 10/48* | (2006.01) |
| *H01M 2/30* | (2006.01) |
| *H01M 2/10* | (2006.01) |

(52) U.S. Cl.
CPC ......... *H01M 2/206* (2013.01); *H01M 2/1077* (2013.01); *H01M 2/30* (2013.01); *H01M 2/348* (2013.01); *H01M 10/482* (2013.01); H01M 2200/103 (2013.01); H01M 2220/20 (2013.01)

(58) Field of Classification Search
CPC .... H01M 2/206; H01M 2/1077; H01M 2/348; H01M 2/30; H01M 10/482
See application file for complete search history.

(56) References Cited

U.S. PATENT DOCUMENTS

| | | | |
|---|---|---|---|
| 2013/0288530 A1* | 10/2013 | Zhao | H01M 2/34 439/627 |
| 2014/0356671 A1* | 12/2014 | Dawley | H01M 10/482 429/90 |
| 2016/0380252 A1 | 12/2016 | Rhein et al. | |
| 2018/0212223 A1 | 7/2018 | Zhao | |

\* cited by examiner

*Primary Examiner* — Olatunji A Godo

(57) ABSTRACT

A bus bar module of a battery system includes a bus bar, a sensing circuit carrier, and a fuse assembly. The bus bar is held by a tray and configured to electrically connect two battery cells of the battery system. The sensing circuit carrier includes at least a first electrical conductor and a dielectric insulator surrounding the first electrical conductor. The fuse assembly includes a first holder terminal, a second holder terminal, and a fuse disposed between and electrically connected to the first and second holder terminals. The first holder terminal is electrically connected to the first electrical conductor of the sensing circuit carrier, and the second holder terminal is electrically connected to the bus bar such that the fuse assembly defines a segment of a voltage sensing line from the bus bar through the sensing circuit carrier towards a control device.

20 Claims, 7 Drawing Sheets

BATTERY BUS BAR MODULE

BACKGROUND

The subject matter herein relates generally to battery systems, such as battery systems for electric vehicles.

Battery systems that can be installed within fully electric or hybrid vehicles typically include a plurality of cells grouped together to form a battery pack. Each of the battery cells includes positive and negative cell terminals, and the cell terminals of different battery cells are electrically connected together using bus bars.

Known battery systems typically include electrical components that are configured to measure operating parameters of the battery cells, such as voltage, current, temperature, pressure, and the like, for monitoring a state of the battery system. For example, the battery system may include a central controller that is connected via conductive circuit paths to the bus bars and/or sensors to receive data representing the operating parameters. Spikes in electrical current from the bus bars through the conductive circuit paths can interrupt operation of the battery system by shorting the central controller, generating excess heat, and/or damaging the central controller, the sensors, or other electrical components.

One potential solution for providing overcurrent protection between the bus bars and the central controller is to install one or more fuses on a printed circuit board, and to connect the printed circuit board along the circuit path between the bus bars and the central controller. However, it may be difficult and/or expensive to electrically connect the circuit board to the bus bars. For example, the battery system may require the addition of discrete wires that connect to the circuit board and the bus bars to provide conductive bridges between the circuit board and the bus bars. In addition to the added assembly time and expense, it may be difficult to provide a reliable electrical connection at the joint between the wires and the bus bars attributable to the bus bars and the wires being composed of different types of metal that do not readily join together. For example, the wires may be copper and the bus bars may be aluminum, and soldering or welding the copper to the aluminum may produce a brittle intermetallic layer at the interface, resulting in a brittle joint. The brittle joint may risk breaking during operation of the battery system, because stresses, strains, vibrations, and other forces may be transferred to the joints.

A need remains for providing reliable, efficient, and cost-effective overcurrent protection of the sensing circuits within the battery systems.

SUMMARY

In one or more embodiments of the present disclosure, a bus bar module of a battery system is provided. The bus bar module includes a bus bar, a sensing circuit carrier, and a fuse assembly. The bus bar is held by a tray and configured to electrically connect two battery cells of the battery system. The sensing circuit carrier includes at least a first electrical conductor and a dielectric insulator surrounding the first electrical conductor. The fuse assembly includes a first holder terminal, a second holder terminal, and a fuse disposed between and electrically connected to the first and second holder terminals. The first holder terminal is electrically connected to the first electrical conductor of the sensing circuit carrier, and the second holder terminal is electrically connected to the bus bar such that the fuse assembly defines a segment of a voltage sensing line from the bus bar through the sensing circuit carrier towards a control device.

In one or more embodiments, a bus bar module of a battery system is provided that includes a bus bar, a flat flexible cable, and a fuse assembly. The bus bar is held by a tray and configured to electrically connect two battery cells of the battery system. The flat flexible cable includes at least a first electrical conductor and a dielectric insulator surrounding the first electrical conductor. The flat flexible cable is spaced apart from the bus bar. The fuse assembly includes a first holder terminal, a second holder terminal, and a fuse disposed between and electrically connected to the first and second holder terminals. The first holder terminal is electrically connected to the first electrical conductor of the flat flexible cable, and the second holder terminal is electrically connected to the bus bar such that the fuse assembly defines a segment of a voltage sensing line from the bus bar through the flat flexible cable towards a control device.

In one or more embodiments, a bus bar module of a battery system is provided that includes a tray, a bus bar, a sensing circuit carrier, and a fuse assembly. The bus bar is held by the tray and configured to electrically connect two battery cells of the battery system. The sensing circuit carrier includes at least a first electrical conductor and a dielectric insulator surrounding the first electrical conductor. The fuse assembly includes a first holder terminal, a second holder terminal, a fuse, and a fuse housing or cavity of the tray. The fuse and the first and second holder terminals are mounted to the fuse housing with the fuse disposed between and electrically connected to the first and second holder terminals. The first holder terminal is electrically connected to the first electrical conductor of the sensing circuit carrier, and the second holder terminal is electrically connected to the bus bar such that the fuse assembly defines a segment of a voltage sensing line from the bus bar through the sensing circuit carrier towards a control device.

DETAILED DESCRIPTION

Figure 1:
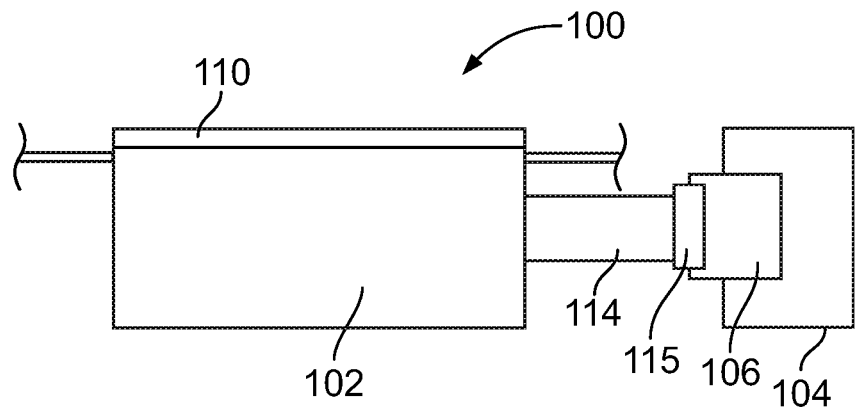
FIG. 1 is a schematic diagram illustrating a battery system according to an embodiment.

FIG. 1 is a schematic diagram illustrating a battery system 100 according to an embodiment. The diagram may represent a side view of the battery system 100. The battery system 100 includes one or more battery modules 102 and corresponding bus bar modules 110 mounted to the battery module(s) 102. Each battery module 102 includes at least one battery cell 108 (shown in FIG. 2). Multiple battery modules 102 may be coupled together to define a battery pack. FIG. 1 shows only one battery module 102 and one bus bar module 110. The battery system 100 may be installed within a vehicle, such as a fully electric vehicle that lacks a fuel-burning engine or a hybrid electrical vehicle that includes a fuel-burning engine. The battery system 100 may be used in other applications in alternative embodiments. Although not shown in FIG. 1, the battery module 102 may be contained within a housing.

The battery system 100 may include a battery control device 104, which may be mounted near to the battery module 102. The battery control device 104 may receive data indicative of operating parameters of the battery module 102, and may analyze and process the data to monitor the operating parameters. The battery control device 104 may include one or more processors that operate based on stored programmed instructions. The battery control device 104 may include or communicate with a vehicle system controller to verify that the battery module 102 is operating within the parameters set for the current condition of the battery module 102. The battery control device 104 may monitor the voltage of the cells 108 (shown in FIG. 2) of the battery module 102. The battery control device 104 may also monitor other operating parameters of the battery module 102, such as temperature, pressure, rate of electric current transfer, and/or the like. The battery control device 104 may supply fault codes to the vehicle system controller. The battery control device 104 may be spaced apart from the battery module 102 as shown in FIG. 1, or alternatively may be mounted on the battery module 102.

In addition to the battery module(s) 102, the bus bar module(s) 110, and the battery control device 104, the battery system 100 also includes one or more sensing circuit assemblies 114. A single sensing circuit assembly 114 is shown in FIG. 1. The sensing circuit assembly 114 provides a communicative pathway between the battery control device 104 and the bus bar module 110 that is mounted on the battery module 102. For example, the sensing circuit assembly 114 includes a connector 115 that releasably couples to a mating connector 106 of the battery control device 104 to establish an electrical circuit path between the sensing circuit assembly 114 and the battery control device 104. The sensing circuit assembly 114 may be electrically connected to bus bars 130 (shown in FIG. 4), temperature sensors, and/or other types of sensors on the bus bar module 110. The sensing circuit assembly 114 conveys electrical signals to the battery control device 104 that represent parameter data to enable the battery control device 104 to monitor the state of the battery module 102.

Figure 2:
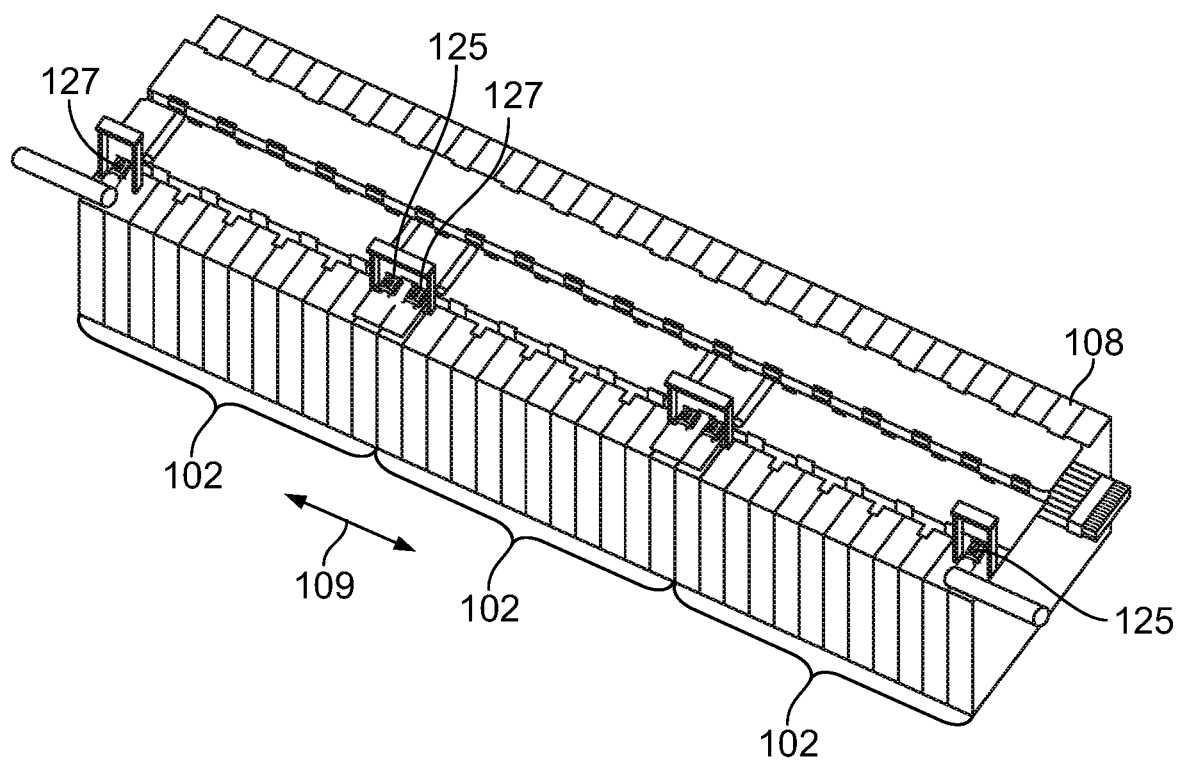
FIG. 2 is a top perspective view of an assembly of multiple battery modules of the batter system.

FIG. 2 is a top perspective view of an assembly of multiple battery modules 102. Each of the battery modules 102 includes a plurality of battery cells 108 arranged side-by-side in a stacked configuration. The battery cells 108 are prismatic battery cells, but may be other types of battery cells in other embodiments. The battery cells 108 are stacked in a cell stack-up direction 109. Optionally, the battery module 102 may include a case or other housing that holds the battery cells 108 in place. A battery cover may be provided over the tops of the battery cells 108.

Each of the battery modules 102 includes a positive battery terminal 125 and a negative battery terminal 127. The battery terminals 125, 127 can be coupled to external power cables or bussed to battery terminals 125, 127 of an adjacent battery module 102. Optionally, the battery terminals 125, 127 may be connected using quick-connection types of connectors.

Figure 3:
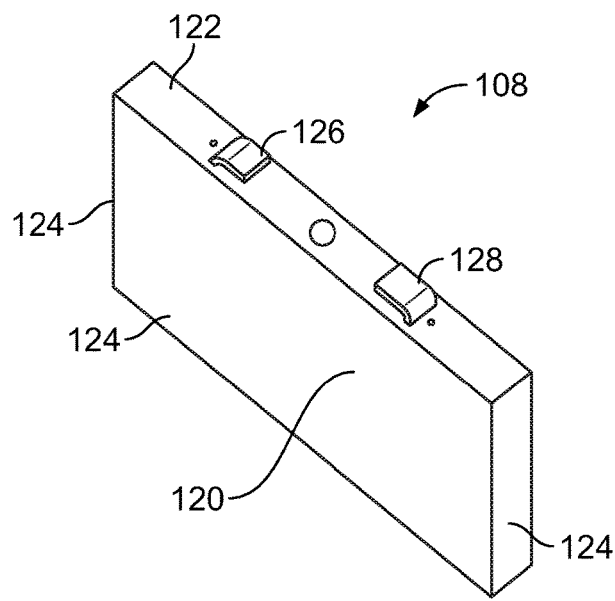
FIG. 3 is a top perspective view of a battery cell of one battery module according to an embodiment.

FIG. 3 is a top perspective view of one of the battery cells 108 according to an embodiment. The battery cell 108 includes a cell housing 120 having a top 122 and side walls 124. In the illustrated embodiment, the cell housing 120 has a box shape with four side walls 124, but the cell housing 120 may have other shapes in alternative embodiments. The battery cell 108 has a positive cell terminal 126 and a negative cell terminal 128. In the illustrated embodiment, the terminals 126, 128 include flat pads having upper surfaces that define connection interfaces for electrical connection to corresponding bus bars 130 (shown in FIG. 4) of the bus bar module 110. The positive cell terminal 126 or the negative cell terminal 128 of an outer battery cell 108 in the cell stack may represent one of the battery terminals 125, 127 of the battery module 102.

Figure 4:
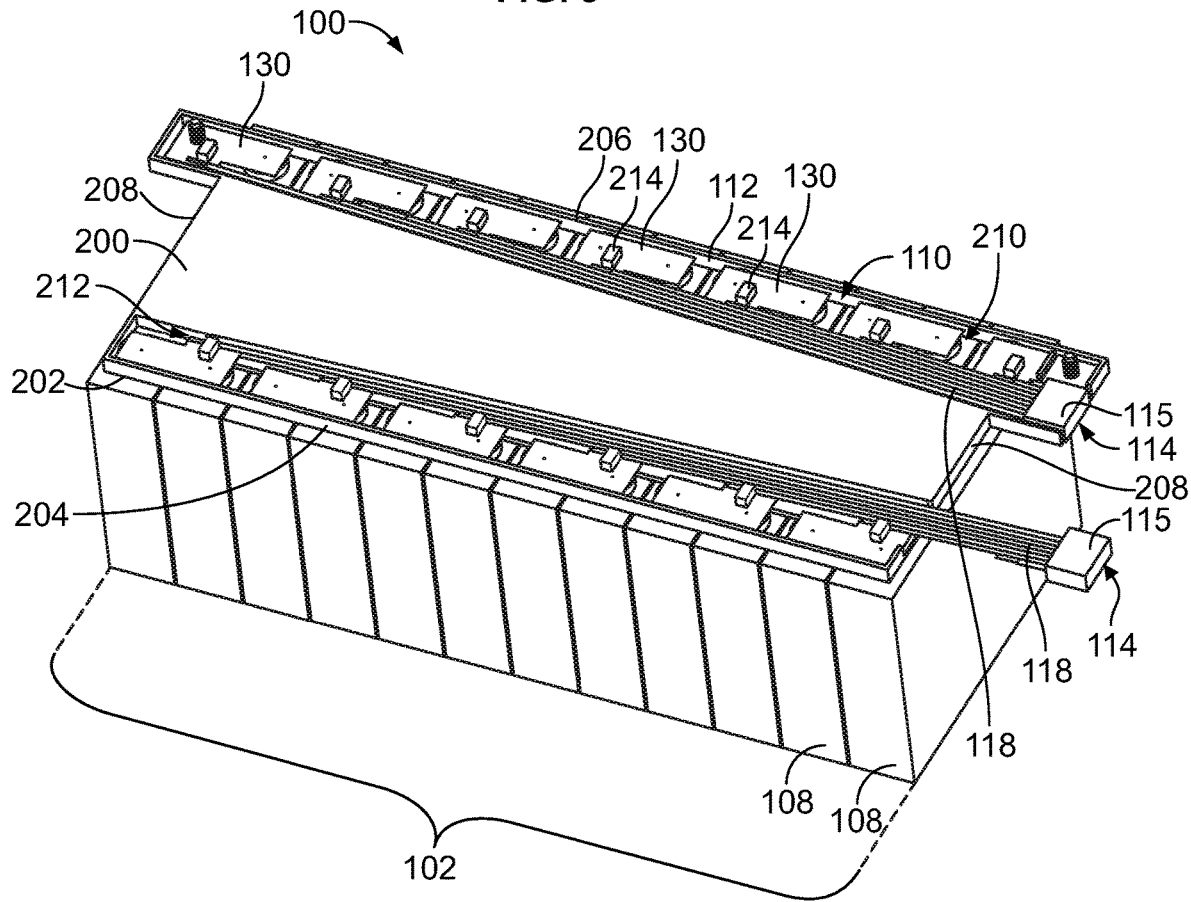
FIG. 4 is a front perspective view of a bus bar module mounted to one battery module of the battery system according to an embodiment.

FIG. 4 is a front perspective view of a bus bar module 110 mounted to one battery module 102 of the battery system 100 according to an embodiment. The bus bar module 110 in the illustrated embodiment includes a tray 112, two sensing circuit assemblies 114, multiple bus bars 130, and multiple fuse assemblies 214. The tray 112 extends lengthwise across the battery cells 108 in the stack. The bus bars 130 and the sensing circuit assembly 114 are held by the tray 112. The bus bars 130 are used to electrically connect adjacent battery cells 108. For example, the bus bars 130 are electrically conductive plates composed of one or more metals. Most of the bus bars 130 extend across two adjacent battery cells 108 to electrically connect the corresponding two battery cells 108. For example, one bus bar 130 mechanically engages the positive cell terminal 126 (shown in FIG. 3) of one battery cell 108 and the negative cell terminal 128 (FIG. 3) of an adjacent battery cell 108 in the stack to provide a conductive bridge that enables current transfer between the two battery cells 108.

The tray 112 includes a top surface 200 and a bottom surface 202. The bottom surface 202 is configured to be mounted to the battery module 102. The tray 112 includes a front 204 and a rear 206 with sides 208 therebetween. A cover may be coupled to the tray 112 at the top surface 200 to cover the sensing circuit carrier 118. The tray 112 includes pockets 210 receiving corresponding bus bars 130. Optionally, the pockets 210 may be positioned generally along the front 204 and the rear 206. The bus bars 130 are arranged in a first row generally along the front 204 and a second row generally along the rear 206. As used herein, relative or spatial terms such as "top," "bottom," "front," "rear," "inner," and "outer" are only used to identify and distinguish the referenced elements according to the illustrated orientations and do not necessarily require particular positions or orientations relative to the surrounding environment of the battery system 100.

Each sensing circuit assembly 114 includes a connector 115 and a sensing circuit carrier 118 electrically connected to the connector 115. The sensing circuit carrier 118 may be a cable, such as a flat flexible cable or a round cable having one or more round insulated wires. Alternatively, the sensing circuit carrier 118 may be a board, such as a flexible printed circuit board or a rigid printed circuit board. The sensing circuit carrier 118 includes multiple electrical conductors and a dielectric insulator that isolates the electrical conductors from one another. The dielectric insulator may be a plastic sheath, a flexible substrate, a rigid board, or the like. The connector 115 optionally may be configured to directly mate with a corresponding mating connector 106 of the battery control device 104, as shown in FIG. 1, or may be indirectly connected to the battery control device 104 via an intervening electrical cable. In FIG. 4, the tray 112 includes two channels 212 oriented to extend lengthwise across the battery cells 108. The channels 212 are both disposed between the two rows of bus bars 130. The two sensing circuit carriers 118 may be routed within the two channels 212.

According to an embodiment, the sensing circuit carriers 118 are indirectly electrically connected to the bus bars 130 via the fuse assemblies 214. For example, the fuse assemblies 214 may be coupled in-line between the sensing circuit carriers 118 and the bus bars 130. One sensing circuit carrier 118 is electrically connected, via the fuse assemblies 214, to the row of bus bars 130 along the front 204 and the other sensing circuit carrier 118 is electrically connected, via the fuse assemblies 214, to the row of bus bars 130 along the rear 206. The sensing circuit carriers 118 of the sensing circuit assemblies 114 are electrically connected to the bus bars 130 to monitor voltages and/or other electrical parameters across the battery cells 108 of the battery module 102. The sensing circuit carriers 118 provide conductive circuit paths from the fuse assemblies 214 towards the battery control device 104 (shown in FIG. 1). The battery control device 104 is able to monitor the voltage between corresponding battery cells 108 by receiving electrical signals conveyed along a respective voltage sense line. In at least one embodiment, the fuse assembly 214 that is electrically connected to the bus bar 130 that is coupled to the two battery cells 108 defines a segment of the voltage sense line. The conductor of the sensing circuit carrier 118 that is electrically connected to that fuse assembly 214 defines another segment of the voltage sense line. Electrical signals indicative of voltage measurements are conveyed to the battery control device 104 along the voltage sense line.

The fuse assemblies 214 are configured to prevent short circuiting of the battery control device 104 and other damage to the battery system 100 resulting from current spikes through the voltage sense lines. The fuse assemblies 214 may include sacrificial fuse devices that provide overcurrent protection. For example, when an excess current flows through one of the fuse assemblies 214, the fuse assembly 214 breaks (e.g., opens) the conductive current path to block the excessive current from causing damage or otherwise interrupting operation of the battery system 100. Without the fuse assemblies 214, the current spikes may cause overheating which can damage components of the bus bar module 110 and potentially start a fire. In the illustrated embodiment, a fuse assembly 214 is located along each of the voltage sense lines between the bus bars 130 and the sensing circuit carriers 118. For example, each of the bus bars 130 has a fuse assembly 214 connected thereto. In an alternative embodiment, only a subset of the voltage sense lines includes an integrated fuse assembly 214.

Figure 5:
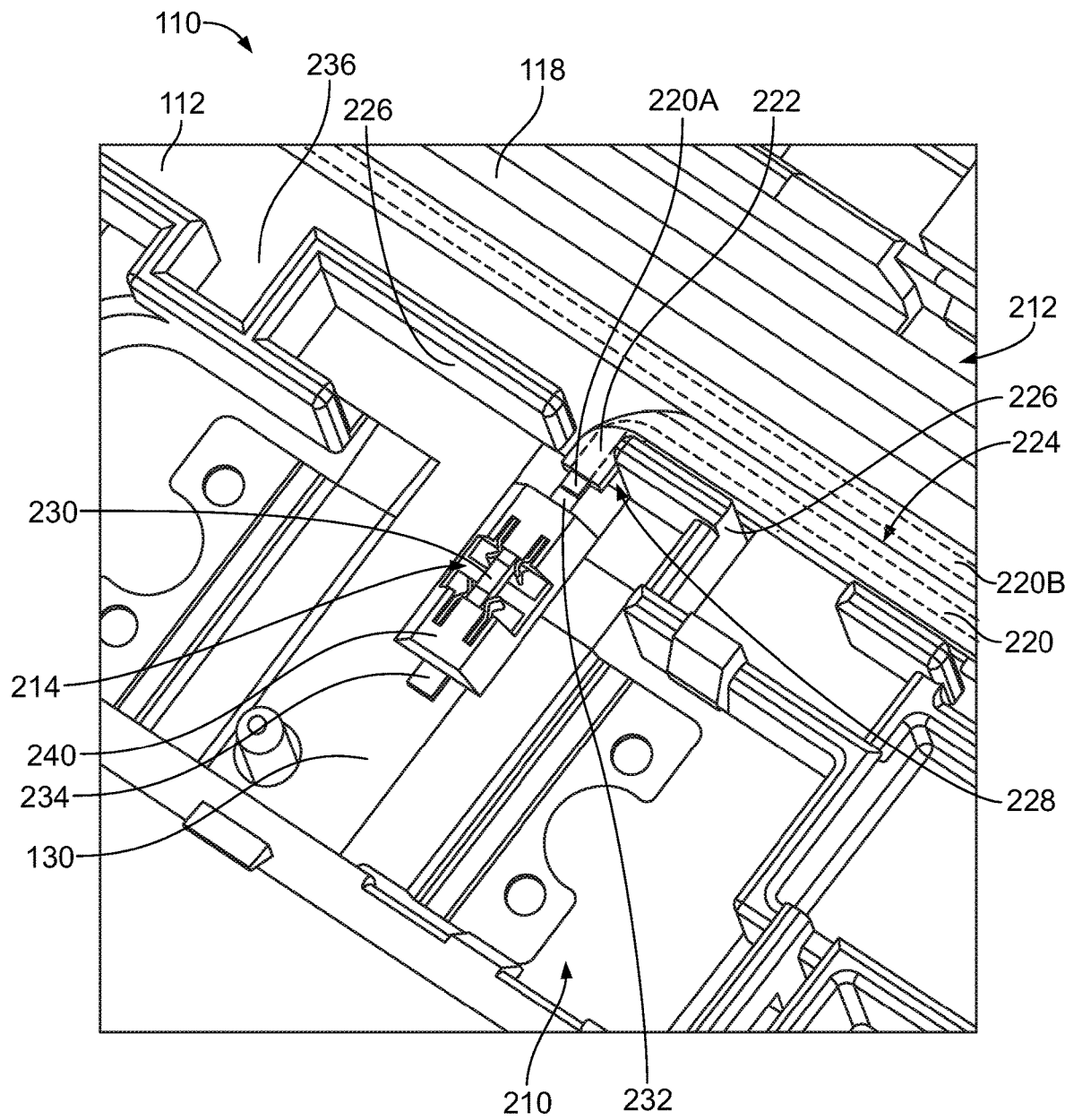
FIG. 5 is a close-up perspective view of a portion of the bus bar module according to an embodiment.

FIG. 5 is a close-up perspective view of a portion of the bus bar module 110 according to an embodiment. The illustrated portion shows one bus bar 130, one fuse assembly 214, and one sensing circuit carrier 118 on the tray 112. The bus bar 130 is disposed in one pocket 210 of the tray 112, and the sensing circuit carrier 118 is within one channel 212 of the tray 112. In the illustrated embodiment, the tray 112 includes integral walls 226 between the pocket 210 and the channel 212. The walls 226 project from a floor 236 of the tray 112. The sensing circuit carrier 118 is separated from the bus bar 130 by the walls 226 of the tray 112. The walls 226 may define a pass-through opening 228 through which the illustrated fuse assembly 214 is electrically connected to a first electrical conductor 220A of the sensing circuit carrier 118.

The sensing circuit carrier 118 includes multiple electrical conductors 220 that are held in place and separated from one another by a dielectric insulator 222. The electrical conductors 220 of the sensing circuit carrier 118 may be electrically connected to different fuse assemblies 214 of the bus bar module 110. Because the sensing circuit carrier 118 is utilized for voltage monitoring in the illustrated embodiment, the electrical conductors 220 define separate voltage sense lines.

The sensing circuit carrier 118 may be a cable, a board, or the like. In the illustrated embodiment, the sensing circuit carrier 118 is a flat flexible cable. The electrical conductors 220 are relatively flat wires, and the dielectric insulator 222 is a sheath that surrounds and encases each of the electrical conductors 220. Lengths of two of the electrical conductors 220 within the dielectric insulator 222 are shown in phantom in FIG. 5. The flat flexible cable may include creases 224 that enable splitting one or more of the electrical conductors 220 from other electrical conductors 220 of the flat flexible cable. For example, in FIG. 5, a segment of a first electrical conductor 220A of the flat flexible cable is separated from the other electrical conductors 220 along a crease 224 and is bent towards the illustrated fuse assembly 214 for electrical connection to the fuse assembly 214. The first electrical conductor 220A may extend through the pass-through opening 228 in the tray 112 to electrically connect to the fuse assembly 214. Alternatively, an elongated conductive arm of the fuse assembly 214 may extend through the opening 228 in the tray 112. A second electrical conductor 220B of the sensing circuit carrier 118 may be electrically connected to another bus bar 130 (not shown) that is held by the tray 112 next to the illustrated bus bar 130. The second electrical conductor 220B defines a different voltage sensing line than the voltage sensing line defined by the first electrical conductor 220A.

In a first alternative embodiment, the sensing circuit carrier 118 is a flexible printed circuit board. For example, the electrical conductors 220 may be electrical traces that are embedded on a flexible substrate that represents the dielectric insulator 222. The flexible substrate may allow a portion of the sensing circuit carrier 118 including the first electrical conductor 220A to extend (e.g., bend or project) towards the fuse assembly 214 as shown in FIG. 5. In a second alternative embodiment, the sensing circuit carrier 118 may be a round cable. For example, the electrical conductors 220 may be round wires, and the dielectric insulator 222 is an insulative sheath individually surrounding the round wires. The insulated wires are flexible to enable the first electrical conductor 220A to bend towards the fuse assembly 214. In a third alternative embodiment, the sensing circuit carrier 118 may be a rigid printed circuit board. For example, the electrical conductors 220 may be electrical traces that are embedded on a rigid substrate that represents the dielectric insulator 222. In the third alternative embodiment, the first electrical conductor 220A may not be able to extend towards the fuse assembly 214, but the fuse assembly 214 may include or may be connected to an elongated conductive arm that extends from the fuse assembly 214 through the pass-through opening 228 in the tray 112 to the rigid printed circuit board to electrically connect to the first electrical conductor 220A.

The fuse assembly 214 includes a fuse 230, a first holder terminal 232, and a second holder terminal 234. The fuse 230 is disposed between the first and second holder terminals 232, 234 and is electrically connected to both of the holder terminals 232, 234. The first holder terminal 232 is electrically connected to the first electrical conductor 220A of the sensing circuit carrier 118. The second holder terminal 234 is electrically connected to the bus bar 130. The fuse assembly 214 defines a segment of the voltage sensing line that extends from the bus bar 130 through the sensing circuit carrier 118 towards the battery control device 104 (shown in FIG. 1). For example, the fuse assembly 214 is in-line (e.g., in series) along a conductive pathway between the bus bar 130 and the first electrical conductor 220A. Electric current conveyed along the voltage sensing line is transferred from the bus bar 130 (in contact with the battery cells 108 shown in FIG. 4) to the second holder terminal 234. From the second holder terminal 234, the current is transmitted along the fuse 230 to the first holder terminal 232. From the first holder terminal 232, the current is transmitted to the first electrical conductor 220A and then along the first electrical conductor 220A towards the control device 104.

In the illustrated embodiment, the fuse assembly 214 also includes a fuse housing 240. The fuse housing 240 may include an electrically insulative material, such as one or more plastics. The fuse 230 and both the first and second holder terminals 232, 234 may be mounted to the fuse housing 240. The fuse housing 240 may structurally support the fuse 230 and/or the holder terminals 232, 234. The fuse housing 240 optionally may provide strain relief and/or vibration dampening for the fuse 230 and the holder terminals 232, 234.

Figure 6:
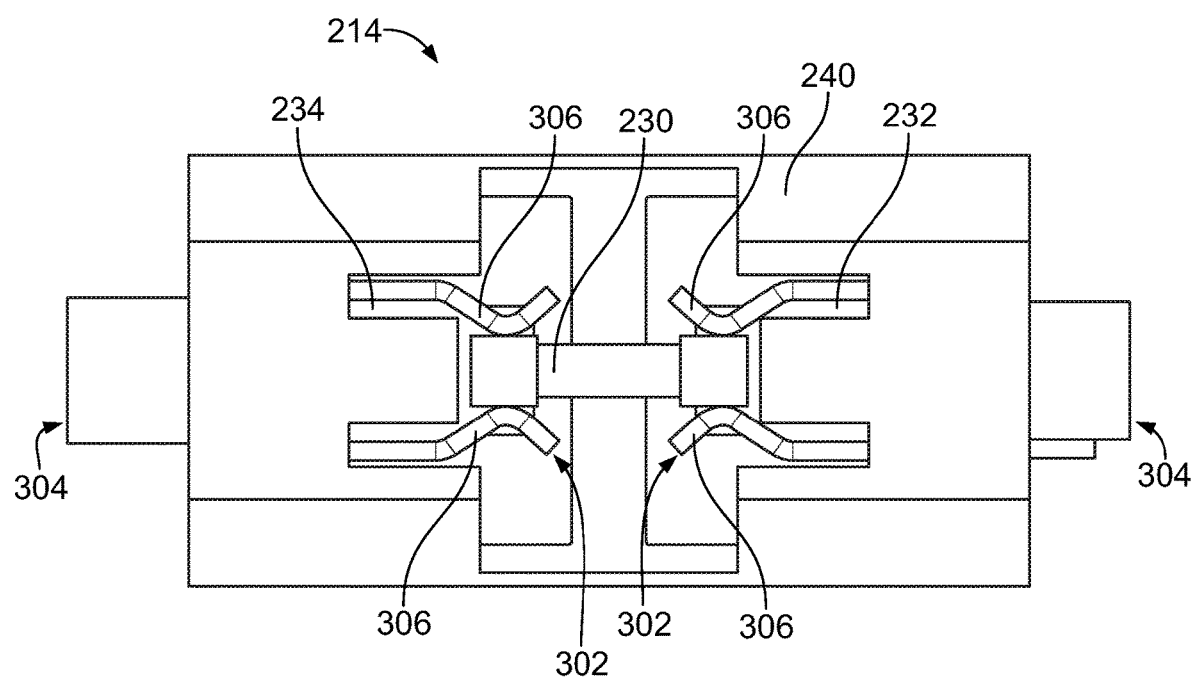
FIG. 6 is a top-down plan view of a fuse assembly of the bus bar module shown in FIG. 5.

FIG. 6 is a top-down plan view of the fuse assembly 214 of the bus bar module 110 shown in FIG. 5. The fuse 230 of the fuse assembly 214 includes a conductive element that is configured to break (e.g., open) a conductive pathway between the first and second holder terminals 232, 234 in response to a rate of electric current through the fuse 230 exceeding a designated threshold rate. The conductive element may be a metal wire or strip that melts due to heat generated by excessive current transfer along the element. The designated threshold current rate of the fuse 230 may be selected based on the application. For example, the designated threshold current rate may be selected such that the designated threshold current is below current rates that risk causing the battery control device 104 (shown in FIG. 1) to short-circuit. As a result, if a current surge sufficient to short the control device 104 is conveyed across the fuse 230, the conductive element will melt and/or rupture, breaking the circuit between the bus bar 130 (shown in FIG. 5) and the electrical conductor 220A (FIG. 5). The open, non-conducting circuit prevents the current surge from shorting the control device 104.

In the illustrated embodiment, the fuse 230 is held between the first and second holder terminals 232, 234 by an interference fit. The fuse 230 may be removable, which enables replacing the fuse 230 after the fuse 230 blows. Optionally, the fuse 230 may be covered by a potting material to protect the fuse 230 from external impacts, debris, external heat, or the like, and/or to secure the fuse 230 in place between the holder terminals 232, 234.

Each of the first and second holder terminals 232, 234 has a fuse end 302 and a termination end 304. The fuse ends 302 engage and electrically connect to the fuse 230. In the illustrated embodiment, the fuse end 302 of each holder terminal 232, 234 has two deflectable spring beams 306 that clamp onto the fuse 230 by engaging and exerting a spring force upon opposite sides of the fuse 230. The termination end 304 of the first holder terminal 232 electrically connects to the electrical conductor 220A (shown in FIG. 5) of the sensing circuit carrier 118. The termination end 304 of the second holder terminal 234 electrically connects to the bus bar 130 (shown in FIG. 5). The holder terminals 232, 234 may be stamped and formed from one or more sheets of metal, or alternatively may be formed via a molding or casting process. The fuse housing 240 may be overmolded onto the holder terminals 232, 234. Alternatively, the fuse housing 240 is discretely formed from the holder terminals 232, 234, and the holder terminals 232, 234 are thereafter coupled to the fuse housing 240 via an adhesive, integrated retention features, clips, latches, fasteners, or the like.

Figure 7:
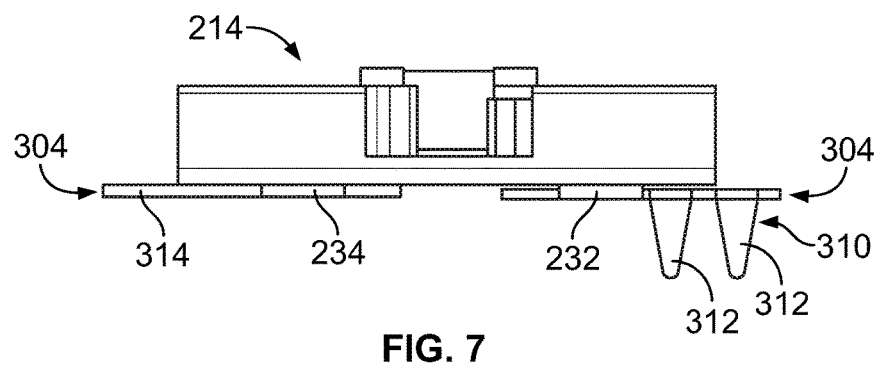
FIG. 7 is a side view of the fuse assembly shown in FIGS. 5 and 6.

FIG. 7 is a side view of the fuse assembly 214 shown in FIGS. 5 and 6. The fuse assembly 214 is shown in a disconnected state, such that the fuse assembly 214 is electrically isolated from the bus bar 130 (shown in FIG. 5) and the sensing circuit carrier 118 (FIG. 5). The termination ends 304 of the first and second holder terminals 232, 234 may have contact surfaces and/or features that are designed to enable efficient connections to the mating components. The termination end 304 of the first holder terminal 232 optionally may be different than the termination end 304 of the second holder terminal 234. For example, in the illustrated embodiment, the termination end 304 of the first holder terminal 232 has a crimp barrel 310 with two crimp fingers 312. The crimp barrel 310 is configured to be crimped to the electrical conductor 220A (shown in FIG. 5) of the sensing circuit carrier 118. The termination end 304 of the second holder terminal 234 has a flat tab 314 for bonding to the bus bar 130.

Figure 8:
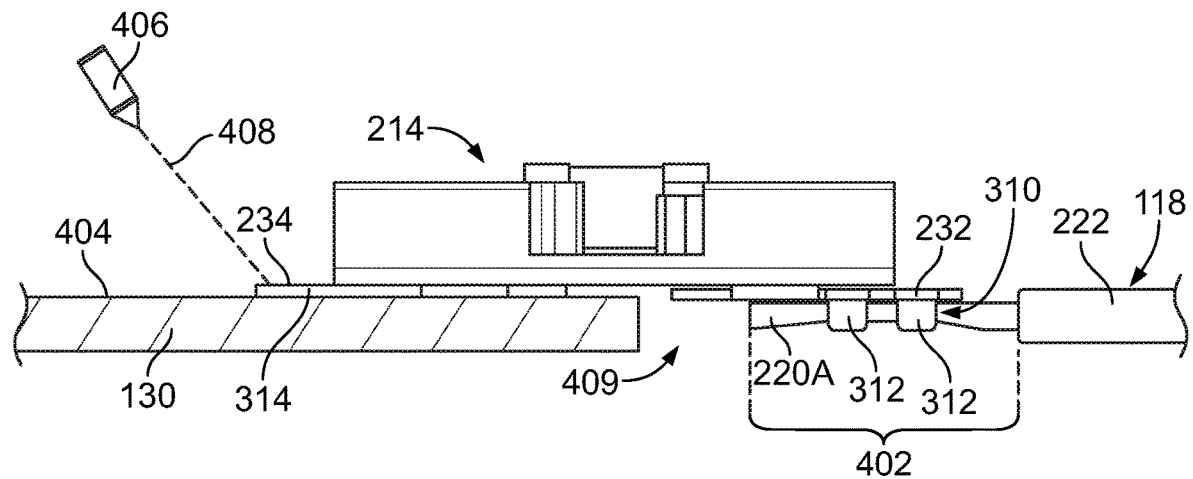
FIG. 8 is a side view showing the fuse assembly in a connected state electrically connected to a bus bar and an electrical conductor of a sensing circuit carrier according to the embodiment shown in FIGS. 5 through 7.

FIG. 8 is a side view showing the fuse assembly 214 in a connected state electrically connected to the bus bar 130 and the electrical conductor 220A of the sensing circuit carrier 118 according to the embodiment shown in FIGS. 5 through 7. In the illustrated embodiment, the electrical conductor 220A is crimped within the crimp barrel 310 of the first holder terminal 232. The crimp fingers 312 engage and compress the electrical conductor 220A along an exposed segment 402 of the electrical conductor 220A that protrudes from the dielectric insulator 222.

The flat tab 314 of the second holder terminal 234 is disposed on a top surface 404 of the bus bar 130. The flat tab 314 is bonded to the bus bar 130 via welding, soldering, brazing, a conductive adhesive, or the like. In the illustrated embodiment, the flat tab 314 may be laser welded onto the top surface 404 of the bus bar 130 using a laser source 406 to emit high energy pulses 408 towards the flat tab 314. The high energy pulses 408 may melt portions of the flat tab 314 and/or the top surface 404 of the bus bar 130, which mechanically secures the flat tab 314 to the top surface 404 upon cooling and solidifying. Optionally, the flat tab 314 may be plated in a metal material that enables efficient and reliable welding to the bus bar 130. For example, the bus bar 130 may include aluminum, and the flat tab 314 may be plated in a nickel or the like.

As shown in FIG. 8, the first and second holder terminals 232, 234 may be directly terminated to the respective electrical conductor 220A and bus bar 130 through direct mechanical engagement. In an alternative embodiment, at least one of the holder terminals 232, 234 may be indirectly connected to the corresponding component via an intervening conductive bridge member, such as an elongated strip or wire. Furthermore, the sensing circuit carrier 118 in the illustrated embodiment is spaced apart from the bus bar 130, such that no part of the sensing circuit carrier 118 engages the bas bar 130. As shown in FIG. 8, the electrical conductor 220A of the sensing circuit carrier 118 is separated from the bus bar 130 by a gap 409. The fuse assembly 214 is connected in series between the bus bar 130 and the sensing circuit carrier 118 to define a segment of the voltage sense line linking the bus bar 130 to the electrical conductor 220A. For example, without the fuse assembly 214, the sensing circuit carrier 118 would not be electrically connected to the bus bar 130.

Figure 9:
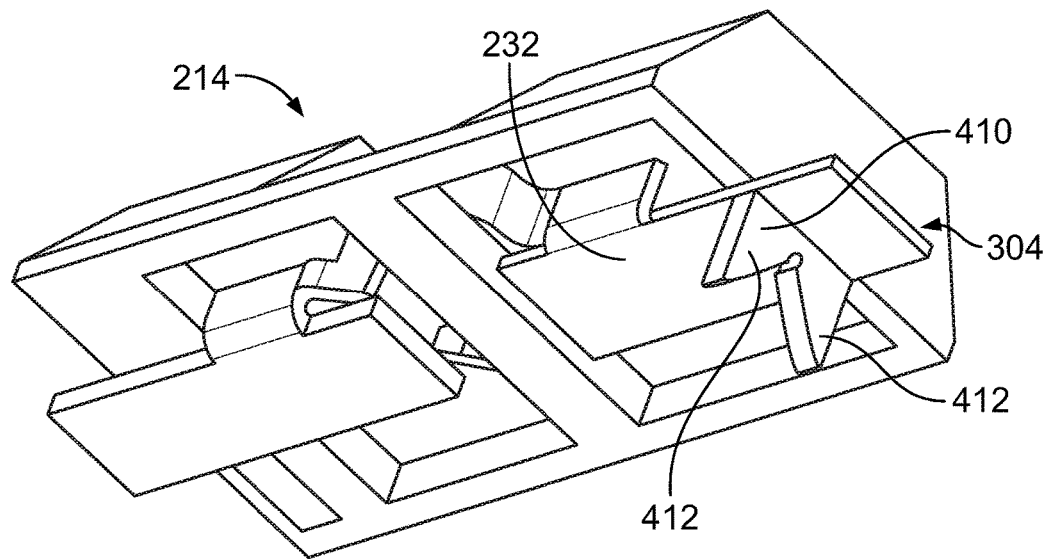
FIG. 9 is a bottom perspective view of the fuse assembly according to an alternative embodiment.

FIG. 9 is a bottom perspective view of the fuse assembly 214 according to an alternative embodiment. Instead of the crimp barrel 310 shown in FIGS. 7 and 8, the termination end 304 of the first holder terminal 232 in the illustrated embodiment has an insulation displacement contact 410. The insulation displacement contact 410 is a pierce-style contact. The insulation displacement contact 410 in FIG. 9 has two jagged teeth 412 that are configured to penetrate through the dielectric insulator 222 (shown in FIG. 8) of the sensing circuit carrier 118 (FIG. 8). The electrical conductor 220A (shown in FIG. 8) may be received between the two teeth 412, and may engage the teeth 412 and/or another section of the contact 410 to electrically connect the holder terminal 232 to the conductor 220A. Due to the teeth 412, the insulation displacement contact 410 is able to terminate (e.g., electrically connect to and mechanically engage) the electrical conductor 220A without first stripping the dielectric insulator 222 to expose a portion of the conductor 220A.

In other alternative embodiments, the termination end 304 of the first holder terminal 232 may be other than a crimp barrel and an insulation displacement contact, such as a flat tab, a spring beam, a pin, a socket, or the like. Likewise, the termination end 304 of the second holder terminal 234 may be other than a flat tab in an alternative embodiment, such as one of the options listed above.

Figure 10:
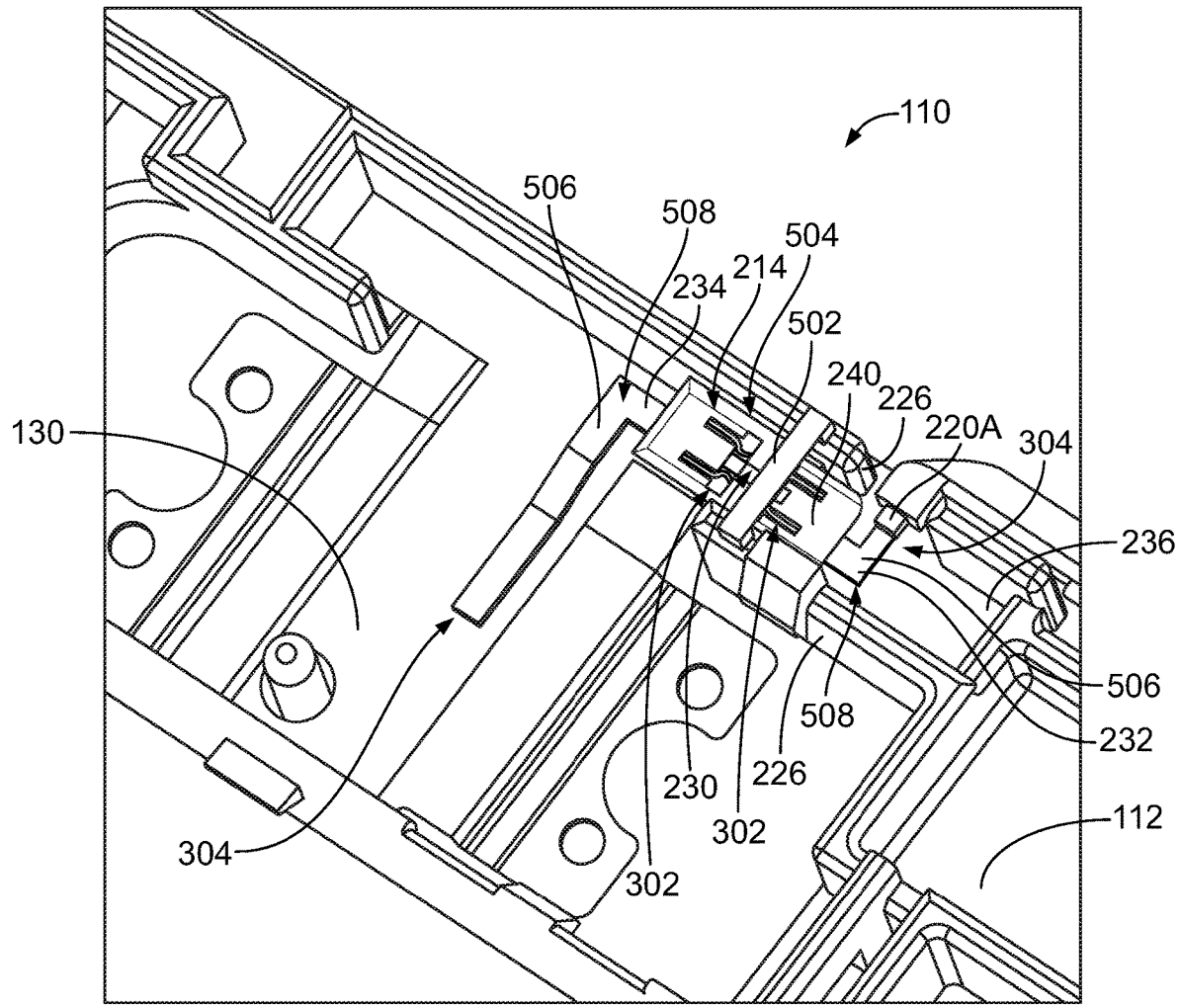
FIG. 10 is a close-up perspective view of a portion of the bus bar module according to a second embodiment.

FIG. 10 is a close-up perspective view of a portion of the bus bar module 110 according to a second embodiment. In the illustrated embodiment, the fuse housing 240 of the fuse assembly 214 is mounted directly on the tray 112 instead of on the bus bar 130 as shown in FIGS. 5 and 8. For example, the fuse housing 240 is discrete from the tray 112 and is mounted to the floor 236 of the tray 112 between two walls 226 of the tray 112. The walls 226 of the tray 112 may define a cavity 504, and the fuse housing 240 is disposed within the cavity 504. The fuse housing 240 may be secured to the tray 112 via an adhesive, a clip, a clamp, a fastener, and/or a latch. In the illustrated embodiment, the tray 112 includes a clip 502 that secures the fuse housing 240 in place. The clip 502 extends between the two walls 226 that border the fuse housing 240 across a top of the fuse assembly 214. The clip 502 may be releasable to allow for removing and replacing either the entire fuse assembly 214 or the fuse 230 thereof.

Optionally, both the first and second holder terminals 232, 234 include elongated intermediate segments 506 between the fuse ends 302 and the termination ends 304 thereof. The intermediate segment 506 of the second holder terminal 234 is elongated to span the distance from the fuse housing 240 to the bus bar 130, onto which the termination end 304 of the holder terminal 234 is secured. The intermediate segment 506 provides an electrically conductive bridge from the fuse assembly 214 to the spaced apart bus bar 130. The intermediate segment 506 of the first holder terminal 232 is elongated to provide a transition between the fuse housing 240 and the electrical conductor 220A. For example, in the illustrated embodiment, the fuse housing 240 is oriented generally transverse (e.g., perpendicular) to the end segment of the electrical conductor 220A, and the intermediate segment 506 of the first holder terminal 232 defines a turn 508 (e.g., a right angle turn) to provide an electrically conductive bridge from the fuse assembly 214 to the electrical conductor 220A. The intermediate segment 506 of the second holder terminal 234 also defines a single turn 508 (e.g., a right angle turn) in FIG. 10, but it is recognized that one or both holder terminals 232, 234 may lack a turn or may have multiple turns in another embodiment.

The elongated intermediate segments 506 of the holder terminals 232, 234 allow the fuse assembly 214 to be spaced apart from one or both of the bus bar 130 and the electrical conductor 220. For example, the fuse housing 240 of the fuse assembly 214 may be mounted in a location that is selected for providing desirable protection, thermal insulation, mechanical coupling, and/or the like. The cavity 504 between the walls 226 shown in the illustrated embodiment may represent such a location that provides a desirable environment for the fuse assembly 214.

Figure 11:
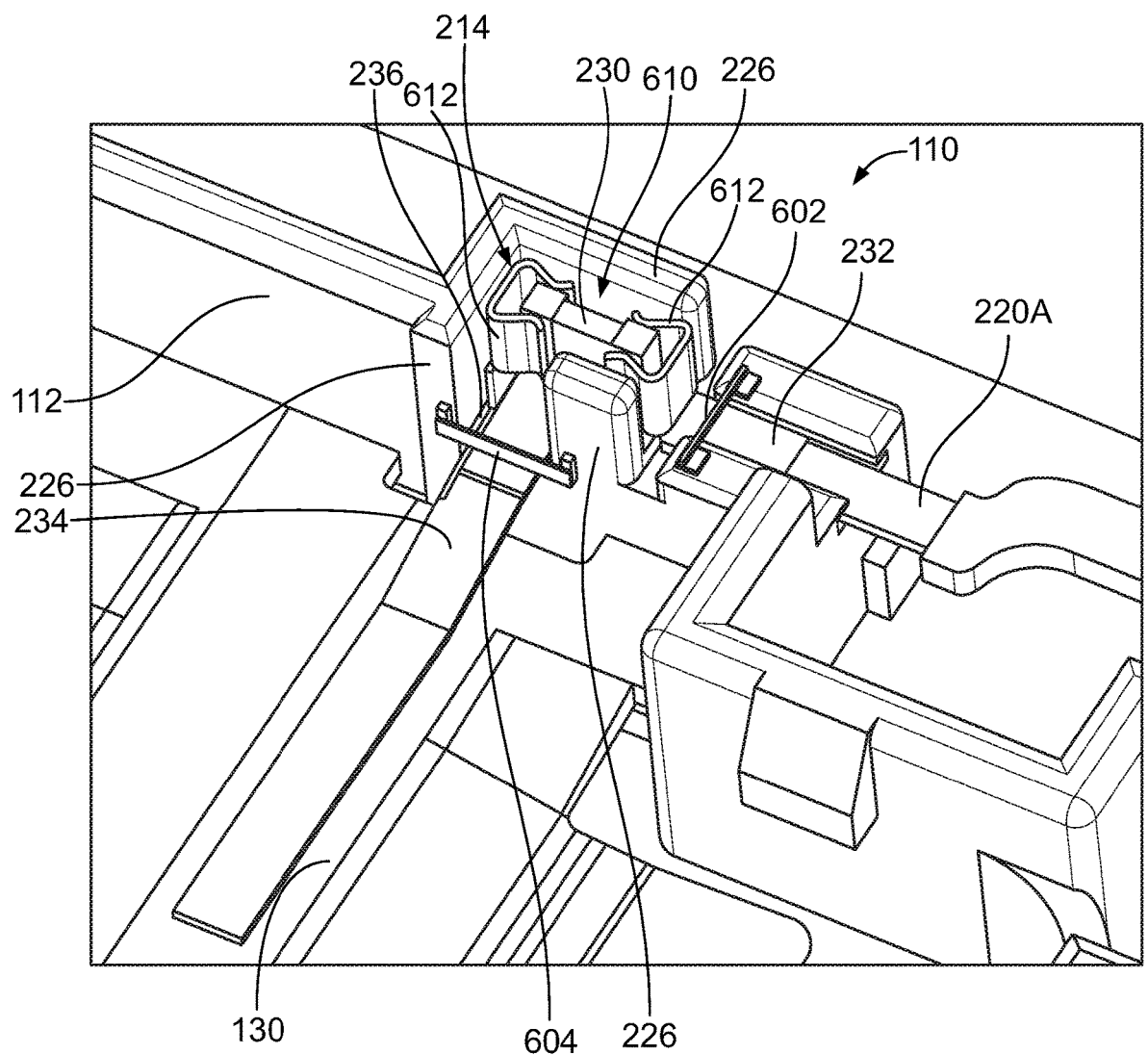
FIG. 11 is a close-up perspective view of a portion of the bus bar module according to a third embodiment.

FIG. 11 is a close-up perspective view of a portion of the bus bar module 110 according to a third embodiment. The fuse assembly 214 in the illustrated embodiment lacks the fuse housing 240 shown in FIGS. 5 and 10. The tray 112, including the floor 236 and the walls 226 thereof, provide a support structure for the fuse assembly 214. For example, the first and second holder terminals 232, 234 of the fuse assembly 214 are mounted to the tray 112, and the fuse 230 is supported between the holder terminals 232, 234. In FIG. 11, the holder terminals 232, 234 have compression spring clamps 612 resembling horseshoes. Each of the spring clamps 612 deflects at least slightly as the fuse 230 is received into a central opening of the spring clamp 612, and the two spring fingers of the spring clamp 612 exert a spring force on opposite sides of the corresponding end of the fuse 230 to hold the end of the fuse 230 via an interference or friction fit. The fuse 230 may be connected to the holder terminals 232, 234 via a different type of clamp fitting or via a more permanent coupling mechanism in another embodiment.

In the illustrated embodiment, the walls 226 of the tray 112 define a cavity 610, and the fuse 230 and spring clamps 612 of the holder terminals 232, 234 are disposed within the cavity 610. The holder terminals 232, 234 project from the cavity 610 to electrically connect to the electrical conductor 220A and bus bar 130, respectively. The holder terminals 232, 234 are secured to the tray 112 via one or more of clips, clamps, latches, adhesive, fasteners, or the like. In the illustrated embodiment, the tray 112 includes a first clip 602 that secures the first holder terminal 232 and a second clip 604 that secures the second holder terminal 234. Each of the clips 602, 604 extends between two corresponding walls 226 of the tray 112 across the respective holder terminal 232, 234. The clips 602, 604 may provide strain relief that reduces the forces exerted at the electrical contact interfaces.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely example embodiments. Many other embodiments and modifications within the spirit and scope of the claims will be apparent to those of ordinary skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A bus bar module of a battery system, the bus bar module comprising:
a bus bar held by a tray, the bus bar configured to electrically connect two battery cells of the battery system;
a sensing circuit carrier including at least a first electrical conductor and a dielectric insulator surrounding the first electrical conductor; and
a fuse assembly including a first holder terminal, a second holder terminal, and a fuse disposed between and electrically connected to the first and second holder terminals, wherein the first holder terminal is electrically connected to the first electrical conductor of the sensing circuit carrier and the second holder terminal is electrically connected to the bus bar such that the fuse assembly defines a segment of a voltage sensing line from the bus bar through the sensing circuit carrier towards a control device, wherein the first holder terminal has at least one of a crimp barrel or an insulation displacement contact that engages and electrically connects to the first electrical conductor.

2. The bus bar module of claim 1, wherein the fuse includes a conductive element that breaks a conductive pathway between the first and second holder terminals in response to a rate of electric current through the fuse exceeding a designated threshold rate.

3. The bus bar module of claim 1, wherein the second holder terminal includes a respective termination end that engages the bus bar, the termination end having a flat tab for bonding to the bus bar.

4. The bus bar module of claim 1, wherein the sensing circuit carrier is one of a flat flexible cable or a flexible printed circuit board.

5. The bus bar module of claim 1, wherein the bus bar is a first bus bar, the fuse assembly is a first fuse assembly, and the bus bar module also includes a second bus bar and a second fuse assembly, the second bus bar held by the tray adjacent to the first bus bar, wherein the sensing circuit carrier includes a second electrical conductor spaced apart from the first electrical conductor by the dielectric insulator, and the second fuse assembly is electrically connected to the second electrical conductor and to the second bus bar to define a segment of a voltage sensing line from the second bus bar through the sensing circuit carrier towards the control device.

6. The bus bar module of claim 1, further comprising the tray, wherein the tray includes one or more of clips, clamps, or latches that engage and secure the first and second holder terminals of the fuse assembly to the tray.

7. The bus bar module of claim 1, further comprising the tray, wherein the tray includes integral walls projecting from a floor of the tray to define a cavity, and the fuse is held within the cavity of the tray.

8. The bus bar module of claim 1, wherein the fuse assembly also includes a fuse housing that is discrete from the tray, wherein the fuse and the first and second holder terminals are mounted to the fuse housing.

9. The bus bar module of claim 8, wherein the fuse housing is mounted to the tray via one or more of an adhesive, a clip, a clamp, or a latch.

10. The bus bar module of claim 1, wherein the sensing circuit carrier is spaced apart from the bus bar.

11. The bus bar module of claim 1, wherein the fuse is removably held between the first and second holder terminals by an interference fit.

12. A bus bar module of a battery system, the bus bar module comprising:
a bus bar held by a tray, the bus bar configured to electrically connect two battery cells of the battery system;
a flat flexible cable including an electrical conductor and a dielectric insulator surrounding the electrical conductor, the flat flexible cable being spaced apart from the bus bar; and
a fuse assembly including a first holder terminal, a second holder terminal, and a fuse disposed between and electrically connected to the first and second holder terminals, wherein the first holder terminal is electrically connected to the electrical conductor of the flat flexible cable and the second holder terminal is electrically connected to the bus bar such that the fuse assembly defines a segment of a voltage sensing line from the bus bar through the flat flexible cable towards a control device, wherein the first holder terminal has at least one of a crimp barrel or an insulation displacement contact that engages and electrically connects to the electrical conductor.

13. The bus bar module of claim 12, wherein the second holder terminal includes a respective termination end that engages the bus bar, the termination end having a flat tab for bonding to the bus bar.

14. The bus bar module of claim 12, further comprising the tray, wherein the tray includes integral walls projecting from a floor of the tray to define a cavity, and the fuse is held within the cavity of the tray.

15. A bus bar module of a battery system, the bus bar module comprising:
a tray,
a bus bar held by the tray and configured to electrically connect two battery cells of the battery system;
a sensing circuit carrier including an electrical conductor and a dielectric insulator surrounding the electrical conductor; and
a fuse assembly including a first holder terminal, a second holder terminal, a fuse, and a fuse housing, the fuse and the first and second holder terminals being mounted to the fuse housing with the fuse disposed between and electrically connected to the first and second holder terminals, wherein the first holder terminal is electrically connected to the electrical conductor of the sensing circuit carrier and the second holder terminal is electrically connected to the bus bar such that the fuse assembly defines a segment of a voltage sensing line from the bus bar through the sensing circuit carrier towards a control device, wherein the fuse is removably held between the first holder terminal and the second holder terminal by an interference fit within the fuse housing.

16. The bus bar module of claim 15, wherein the fuse housing is mounted to the tray via one or more of an adhesive, a clip, a clamp, or a latch.

17. The bus bar module of claim 15, wherein the tray includes integral walls projecting from a floor of the tray to define a cavity, wherein the fuse housing is disposed within the cavity of the tray and is mounted to the tray via one or more of an adhesive, a clip, a clamp, or a latch.

18. The bus bar module of claim 15, wherein each of the first holder terminal and the second holder terminal includes two spring beams at a respective fuse end thereof, and the fuse is held by the two spring beams of the first holder terminal and the two spring beams of the second holder terminal.

19. The bus bar module of claim 15, wherein the first holder terminal has at least one of a crimp barrel or an insulation displacement contact that engages and electrically connects to the electrical conductor.

20. The bus bar module of claim 1, wherein each of the first holder terminal and the second holder terminal includes two spring beams at a respective fuse end thereof, and the fuse is held by the two spring beams of the first holder terminal and the two spring beams of the second holder terminal.

* * * * *